Patented July 5, 1949

2,475,424

UNITED STATES PATENT OFFICE 2,475,424

COPOLYMERS OF N-ALKYLSULFONYL- AND N-ARYLSULFONYL-VINYLAMINES

Joseph B. Dickey and Theodore E. Stanin, Rochester, N. Y., assignors to Eastman Kodak Company, Rochester, N. Y., a corporation of New Jersey No Drawing. Application May 17, 1946, Serial No. 670,536

6 Claims. (Cl. 260—84)

This invention relates to polymeric N-alkylsulfonyl- and N-arylsulfonyl-vinylamines and to a process for their preparation.

It is known that compounds having the general formula:

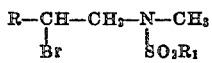

wherein R and R₁ represent organic radicals, can be converted to the corresponding monomeric vinyl compounds by elimination of hydrogen bromide (Kharasch and Priestley, J. Amer. Chem. Soc., 61, 3425 (1939)). Similar sulfonyl group containing vinyl compounds can also be prepared by elimination of hydrogen chloride from beta-chloroethylsulfonamides by reacting with organic or inorganic bases, by dehydration of beta-hydroxy-(or beta-acyloxy-)ethyl-sulfonamides or by pyrolysis of ethylsulfonamides.

We have now found that the monomeric vinyl compounds prepared by the methods above described and having the general formula:

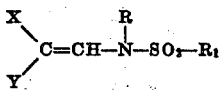

wherein R and R₁ represent substituted or unsubstituted alkyl and aryl groups, and X and Y represent hydrogen, halogen or cyano groups, can be polymerized by themselves or conjointly with other polymerizable unsaturated compounds to give resins varying in properties. For example, some of our new resinous products are valuable for forming films, fibers and molded products, while still others with alkyl sulphonic acid substituent groups are surface active agents suitable for treating various textiles. More specifically, R and R₁ can be methyl, ethyl, propyl, isopropyl, n-butyl, sec.-butyl, iso-butyl, ter.-butyl groups or these groups substituted by a monovalent acyl group such as sulphonic acid or an alkoxy group, such as methoxy, or R and R₁ can be phenyl, benzyl, ortho-, meta- or para-tolyl group, para-aminosulfonylphenyl group and other similar kind of radicals, and X and Y can be hydrogen, halogen such as chlorine or bromine or a cyanide group. The compounds above defined can be copolymerized with one or more unsaturated compounds including vinyl acetate, isopropenyl acetate, methylacrylate, methyl methacrylate, vinyl methyl ketone, isopropenyl methyl ketone, vinyl sulfonamide, isopropenyl sulfonamide, vinylsulfondimethylamide, maleic amide, maleic nitrile, fumaronitrile, ethyl fumarate, ethyl maleate, cis- and trans-carbomethoxyacrylonitrile and amide, methyl fumarate, methyl itaconate, methacrylurea, ortho-acetaminostyrene, 2,5- and 2,4-dichlorostyrene, vinylidene dichloride, vinylidene fluoridechloride, tetrafluoroethylene, acrylic acid, methacrylic acid, alpha-chloroacrylic acid, maleic anhydride, vinyl methyl sulfone, isopropenyl methyl sulfone, methylene malonate, vinyl trifluoroacetate, vinyl isocyanate, vinyl urethane, alpha-acetaminoacrylates, ethylene propylene, iso-butylene, butadiene, 2-chlorobutadiene, 2-acetoxy-butadiene, 2-acetaminobutadiene, vinyl phthalimide, maleic imides, vinyl acetamides and other similar kinds of compounds.

It is, accordingly, an object of our invention to provide the above defined new kind of polymeric compounds. A further object is to provide a process for preparing such polymers. Other objects will become apparent hereinafter.

The polymerization reactions can be carried out using any of the known methods, for example, by means of heat, light, or catalysts such as hydrogen fluoride, boron trifluoride, boron trichloride, oxygen, ozone, lithium phenyl, benzoyl peroxide, furoyl peroxide, acetyl peroxide, chlorourea, dichlorodimethyl hydantoin, and the like. In many cases, valuable and superior products can be obtained by utilizing super atmospheric pressures, for example, pressures in excess of 500 atmospheres, but preferably in excess of 1000 atmospheres. Where the compounds themselves are unable to build up the necessary pressures, an inert gas such as nitrogen or carbon dioxide is employed to obtain such super pressures. The polymerizations can be effected in mass, in solutions of inert solvents such as water, dioxane, benzene, heptane, or, polymerized in the form of beads, in emulsions, and in certain cases, in the gaseous phase. If desired, solid monomers can be melted and sprayed concurrently into a heated chamber with any desired liquid or other solid vinyl type monomer, together with a suitable catalyst of the type illustrated in the preceding to effect polymerization. The monomers to be copolymerized can be mixed and treated under suitable conditions to effect polymerization in any desired molecular ratios. The preferred copolymers of the invention are obtained with starting mixtures having about from 5 to 95 molecular parts of the N-alkylsulfonyl- or N-arylsulfonyl-vinylamine and about from 95 to 5 molecular parts of the unsaturated monomeric compound, although useful products are also obtainable with ratios about from 1 to 99 and about from 99 to 1 molecular parts, respectively.

The polymers and copolymers of the invention can be modified in chemical and physical properties by hydrolysis of the side chains. For example, the sulfonyl groups can be converted to amino groups, acetyl groups to hydroxyl groups in copolymers prepared with vinyl acetate, cyanide groups can be hydrated to the amide and carboxyl groups, and the like. These reactions can be effected in solution or suspension by means of the usual reagents for this purpose, for example, sodium hydroxide, potassium hydroxide, sodium carbonate, tetramethyl ammonium hydroxide, trimethylbenzyl ammonium hydroxide, hydrazine hydrate, hydrochloric acid, hydrofluoric acid, sulfuric acid or phosphoric acid. The following examples will serve to illustrate our new polymers and the methods of obtaining the same.

*Example 1.—Polymer of N-methyl-N-methylsulfonyl-vinylamine*

13.5 grams of N-methyl-N-methylsulfonyl-vinylamine and 0.02 gram of benzoyl peroxide were heated together at 100° C. in a sealed tube, until polymerization was complete. The tube was then opened, the product granulated and purified by extraction with alcohol. This product was a slightly yellowish colored solid. In similar manner as above, there can be prepared polymers of N-methyl-N-methylsulfonyl-$\beta$-chlorovinylamine, N-methyl-N-methylsulfonyl-$\beta$-bromovinylamine or N-methyl-N-methylsulfonyl-$\beta$-cyanovinylamine.

*Example 2.—Polymer of N-methyl-N-methylsulfonyl-isopropenylamine*

15.0 grams of N-methyl-N-methylsulfonyl-isopropenylamine and 0.3 gram of dichlorodimethylhydantoin were polymerized and worked up in the same manner as described in Example 1. The product was a slightly yellowish colored solid.

*Example 3.—Copolymer of N-phenyl-N-phenylsulfonyl-vinylamine and N-methyl-N-para-tolylsulfonyl-$\beta$-chlorovinylamine*

10 grams of N-phenyl-N-phenylsulfonyl-vinylamine, 10 grams of N-methyl-N-para-tolylsulfonyl-$\beta$-chlorovinylamine and 0.2 gram of benzoyl peroxide were dissolved in formamide and heated at 50° C., until no further change could be noted. Water was then added and the yellowish colored product filtered off, washed with water and dried. In place of formamide, there can be substituted acetic acid.

*Example 4.—Polymer of sodium salt of N-sulfoethyl-N-ethylsulfonyl isopropenylamine*

20 grams of the sodium salt of N-sulfoethyl-N-ethylsulfonyl-isopropenylamine and 50 cc. of water were charged into an autoclave and heated to 180°–220° C. under a pressure of about 3000 atmospheres maintained by means of nitrogen gas. After 15 hours, the autoclave was cooled and the viscous mass removed. The product was water-soluble and useful as a surface active agent for the treatment of various textiles.

*Example 5.—Copolymer of N-methyl-N-phenylsulfonyl-vinylamine and vinyl acetate*

10 grams of N-methyl-N-phenylsulfonyl-vinylamine, 10 grams of vinyl acetate and 0.05 gram of benzoyl peroxide were polymerized at 60° C., until no further change could be observed. The product was purified by dissolving in acetone and pouring into water. In place of vinyl acetate, there can be substituted in the above example, vinyl trifluoroacetate, vinyl butyrate, isopropenyl acetate, or cyclohexenyl acetate.

*Example 6.—Copolymer of N-ethyl-N-para-sulfonylphenylsulfamine - isopropenylamine and styrene*

20 grams of styrene and 1 gram of N-ethyl-N-para-sulfonylphenylsulfamine-isopropenylamine $$(CH_2{=}C(CH_3){-}N(C_2H_5){-}$$
$$SO_2{-}C_6H_4{-}SO_2{-}NH_2)$$

were polymerized, in the presence of 0.05 gram of benzoyl peroxide at 80° C., until no further change could be observed. The nearly glass-clear polymer was moldable as obtained. The molecular proportions of the above constituents can be varied within wide limits, since usable polymeric products are obtained with starting compositions, wherein styrene can be present in about from 1 to 99 parts in a total mixture of 100 parts. In place of styrene in the above example, there can be substituted alpha-methyl styrene, 2,4-dichlorostyrene, alpha-acetoxystyrene, ortho-acetamino styrene, para-sulfonamido styrene to obtain related polymeric, moldable products.

*Example 7.—Copolymer of N-methyl-N-methylsulfonyl-vinylamine and methyl methacrylate*

10 grams of N-methyl-N-methylsulfonyl-vinylamine, 30 grams of methyl methacrylate and 0.50 gram of benzoyl peroxide were polymerized to completion at 60° C. The product was obtained as a slightly yellowish-white, moldable solid. In place of the methyl methacrylate in the above example, there can be substituted an equivalent amount of methyl acrylate, butyl acrylate, alpha-chloroethylacrylate, cis- and trans-$\beta$-cyanomethylacrylate to obtain related resinous products. The properties of the resulting products can be varied by changing the proportion of the monomeric compounds of the starting materials. Thus, useful products can be obtained by polymerizing mixtures wherein the alkylsulfonyl-vinylamine varies from about 1 to 99 molecular parts and the acrylate from about 99 to 1 molecular parts.

*Example 8.—Copolymer of N-methyl-N-methylsulfonyl-isopropenylamine and unsaturated alkyl esters*

10 grams of N-methyl-N-methylsulfonyl-isopropylamine, 25 grams of isopropyl fumarate and 10 grams of isopropenyl acetate were polymerized in the presence of 0.50 gram of benzoyl peroxide at 50° C. The product was purified by dissolving in acetone and precipitating in water. The white solid so obtained was moldable. In place of isopropyl fumarate, there can be substituted isopropyl maleate, dimethyl fumarate, alpha-methylethyl fumarate, methyl itaconate to obtain similar kind of moldable polymers.

*Example 9.—Copolymer of N-phenyl-N-butylsulfonyl-vinylamine and methyl isopropenyl ketone*

5 grams of N-phenyl-N-butylsulfonyl-vinylamine, 20 grams of methyl isopropenyl ketone and 0.30 gram of benzoyl peroxide were polymerized at 70° C. The resulting solid was purified by dissolving in acetone and precipitating in water. In place of the methyl isopropenyl ketone, there can be substituted in the above example, an equivalent amount of methyl vinyl ketone, methyl vinyl sulfone or methylisopropenylsulfone to obtain related polymeric products.

Example 10.—Copolymer of N-methyl-N-ortho-tolylsulfonyl-alpha-chlorovinylamine and acrylonitrile 5 grams of N-methyl-N-ortho-tolylsulfonyl-alpha-chloro-vinylamine and 20 grams of acrylonitrile were polymerized at 50° C., using benzoyl peroxide as a catalyst. The yellowish-white solid was acetone soluble. For the acrylonitrile in the above example, there can be substituted alpha-methacrylonitrile or alpha-acetoxy-acrylonitrile.

Example 11.—Copolymer of N-methyl-N-phenylsulfonyl-vinylamine and acrylic amide 10 grams of N-methyl-N-phenylsulfonyl-vinylamine, 20 grams acrylic amide and 0.50 gram benzoyl peroxide were dissolved in acetic acid and polymerized at 50°–80° C., until no further change could be observed. The product was obtained in the form of a slightly yellowish precipitate by pouring the mixture into a large excess of water and stirring. For the acrylic amide in the above example, there can be substituted an equivalent amount of cis- and trans-β-cyanoacrylic amide, maleic acid amide, fumaric acid amide, vinyl sulfonamide, isopropenylsulfonamide, and other similar kind of amides to obtain related polymeric products.

Example 12.—Copolymer of N-methyl-N-methylsulfonyl-isopropenylamine and ethylene 5 grams of N-methyl-N-methylsulfonyl-isopropenylamine were charged into an autoclave, 2 grams of ethylene added and the mixture slowly heated to 180° C., under a nitrogen gas pressure of about 300 atmospheres, until polymerization was complete. The hard, tough polymer obtained thereby was suitable for forming films, fibers and for molding purposes. In place of ethylene in the above example, there can be substituted propylene or isobutylene. The polymerizations can be carried out using any desired ratio of the alkylsulfonyl-vinylamine to the unsaturated hydrocarbon. Also more than two compounds capable of polymerizing can be used, for example, a resinous solid is obtained with 5 grams of N-benzyl-N-para-tolylsulfonyl-alpha-phenylvinylamine, 5 grams of ethylene and 5 grams of isopropenyl acetate polymerized in the manner above described.

Example 13.—Copolymer of N-β-acetoethyl-N-phenylsulfonyl-alpha-ethylvinylamine and vinyl chloride 10 grams of N-β-acetoethyl-N-phenylsulfonyl-alpha-ethylvinylamine, 5 grams of vinyl chloride and 0.10 gram of benzoyl peroxide were polymerized at 50° C., in a sealed tube, until no further change took place. The slightly yellowish polymer so obtained was tough and moldable. For the vinyl chloride in the above example, there can be substituted isopropenyl chloride, alpha-chlorostyrene, β-chloroallyl acetate, vinylidene dichloride, vinylidene chloride-fluoride or tetrachloroethylene to obtain similar kind of halogen containing copolymers.

Example 14.—Copolymer of N-ethyl-N-phenylsulfonyl-vinylamine and tetrachloroethylene 5 grams of N-ethyl-N-phenylsulfonyl-vinylamine and 5 grams of tetrachloroethylene were polymerized in an autoclave at a temperature of about 200° C., under a pressure of about 2000 atmospheres maintained by injection of nitrogen. The product was a tough, high melting solid.

Example 15.—Copolymer of N-methyl-N-phenylsulfonyl-beta-cyanovinylamine and butadiene 4 grams of N-methyl-N-phenylsulfonyl-beta-cyanovinylamine, 16 grams of butadiene, 0.5 gram of urea peroxide, 0.05 gram of 2-ethyl hexanol, 0.06 gram of carbon tetrachloride and 0.18 gram of a sodium alkyl naphthalene sulfonate were emulsified and held at 55° C., for a period of four days with stirring. Then phenyl-alpha-naphthylamine was added and the polymer precipitated by adding acetic acid. The polymer so obtained was a tough, elastic and vulcanizable solid. In place of the butadiene in the above example, there can be substituted 2-methylbutadiene, 2,3-dimethylbutadiene, 1-cyanobutadiene, 2-cyanobutadiene, 1-acyloxybutadiene, 2-acyloxybutadiene or 2-chlorobutadiene to obtain related polymeric products.

What we claim is:

1. A copolymer obtained by heating in the presence of a polymerization catalyst a mixture containing as the sole unsaturated components from 5 to 95 molecular parts of N-methyl-N-phenylsulfonyl-vinylamine and from 95 to 5 molecular parts of vinyl acetate.

2. A copolymer obtained by heating in the presence of a polymerization catalyst a mixture containing as the sole unsaturated components from 5 to 95 molecular parts of N-methyl-N-methylsulfonyl-vinylamine and from 95 to 5 molecular parts of methyl methacrylate.

3. The process which comprises heating in the presence of a polymerization catalyst a mixture containing as the sole unsaturated components from 5 to 95 molecular parts of N-methyl-N-phenylsulfonyl-vinylamine and from 95 to 5 molecular parts of vinyl acetate.

4. The process which comprises heating in the presence of a polymerization catalyst a mixture containing as the sole unsaturated components from 5 to 95 molecular parts of N-methyl-N-methylsulfonyl-vinylamine and from 95 to 5 molecular parts of methyl methacrylate.

5. A copolymer obtained by heating in the presence of a polymerization catalyst a mixture containing as the sole unsaturated components from 5 to 95 molecular parts of a compound having the general formula:

wherein R and R₁ each represents a member selected from the group consisting of an alkyl group having from 1 to 4 carbon atoms and a phenyl group, and from 95 to 5 molecular parts of a compound containing a polymerizable

grouping.

6. The process which comprises heating in the presence of a polymerization catalyst a mixture containing as the sole unsaturated components from 5 to 95 molecular parts of a compound having the general formula:

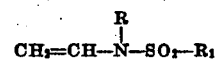

wherein R and R₁ each represents a member selected from the group consisting of an alkyl group of from 1 to 4 carbon atoms and a phenyl group, and from 95 to 5 molecular parts of a compound containing a polymerizable
grouping.
JOSEPH B. DICKEY.
THEODORE E. STANIN.
REFERENCES CITED
The following references are of record in the file of this patent:
UNITED STATES PATENTS
| Number | Name | Date |
|---|---|---|
| 2,317,804 | Reppe | Apr. 27, 1943 |